(12) United States Patent
Ikawa et al.

(10) Patent No.: US 9,778,625 B2
(45) Date of Patent: *Oct. 3, 2017

(54) FACILITY CONTROL SYSTEM AND FACILITY CONTROL METHOD

(71) Applicant: Daifuku Co., Ltd., Osaka-shi (JP)

(72) Inventors: Kouichi Ikawa, Osaka (JP); Kazuto Mori, Osaka (JP)

(73) Assignee: Daifuku Co., Ltd., Osaka-shi (JP)

( * ) Notice: Subject to any disclaimer, the term of this patent is extended or adjusted under 35 U.S.C. 154(b) by 742 days.

This patent is subject to a terminal disclaimer.

(21) Appl. No.: 13/622,682

(22) Filed: Sep. 19, 2012

(65) Prior Publication Data

US 2013/0253669 A1 Sep. 26, 2013

(30) Foreign Application Priority Data

Sep. 20, 2011 (JP) .................................. 2011-205093

(51) Int. Cl.
 *G05B 9/02* (2006.01)
 *G06F 11/20* (2006.01)

(52) U.S. Cl.
 CPC .............. *G05B 9/02* (2013.01); *G06F 11/202* (2013.01); *G06F 11/2023* (2013.01); *G06F 11/2033* (2013.01); *G06F 11/2035* (2013.01)

(58) Field of Classification Search
 CPC .............. G06F 11/202; G06F 11/2023; G06F 11/2033; G06F 11/2035
 USPC ....................................................... 700/79, 2
 See application file for complete search history.

(56) References Cited

U.S. PATENT DOCUMENTS

| 4,321,666 A * | 3/1982 | Tasar ...................... G06F 11/00 714/10 |
| 5,086,384 A * | 2/1992 | Fukada .......................... 700/82 |
| 6,230,284 B1 * | 5/2001 | Lillevold ............ G06F 11/0709 713/2 |
| 6,421,688 B1 * | 7/2002 | Song |
| 6,477,439 B1 * | 11/2002 | Bernaden et al. ............ 700/103 |
| 6,490,610 B1 * | 12/2002 | Rizvi .................. G06F 11/2028 707/999.01 |

(Continued)

FOREIGN PATENT DOCUMENTS

| JP | 420039 A | 1/1992 |
| JP | 9104509 A | 4/1997 |

(Continued)

*Primary Examiner* — Jason Lin
(74) *Attorney, Agent, or Firm* — The Webb Law Firm

(57) ABSTRACT

A facility control system comprises a selection processing portion that selects, based on a manual operation and when an abnormal condition occurs in a second-layer computer that issues a task command to a first-layer program which issues an apparatus operating command to an apparatus controller, whether to cause a first-layer computer to execute a second-layer program that had been executed by the second-layer computer, and a substitute command output processing portion which outputs a substitute command in accordance with selection information selected by the selection processing portion. The first-layer computer executes the second-layer program that had been executed by the second-layer computer in which the abnormal condition occurred based on a substitute command outputted by the substitute command output processing portion.

14 Claims, 6 Drawing Sheets

(56) References Cited

U.S. PATENT DOCUMENTS

| | | | |
|---|---|---|---|
| 6,523,139 B1* | 2/2003 | Banning et al. | 714/43 |
| 6,594,620 B1* | 7/2003 | Qin et al. | 702/185 |
| 6,741,919 B1* | 5/2004 | Schuster et al. | 701/29.4 |
| 7,124,041 B1* | 10/2006 | Johnson et al. | 702/58 |
| 7,971,094 B1* | 6/2011 | Benn | G06F 11/2025 714/11 |
| 8,030,803 B1* | 10/2011 | Ford | 307/326 |
| 8,856,522 B2* | 10/2014 | Grgic | G06F 21/6236 713/166 |
| 2002/0089234 A1* | 7/2002 | Gilbreth et al. | 307/80 |
| 2004/0153757 A1* | 8/2004 | Blakeney | G06F 11/2023 714/13 |
| 2005/0180095 A1* | 8/2005 | Ellis | 361/600 |
| 2005/0240840 A1* | 10/2005 | Taylor | H04B 1/74 714/724 |
| 2006/0218419 A1* | 9/2006 | Iwamura | G06F 1/3209 713/300 |
| 2008/0133687 A1* | 6/2008 | Fok et al. | 709/207 |
| 2008/0312755 A1* | 12/2008 | Yoshida et al. | 700/23 |
| 2009/0187282 A1* | 7/2009 | Menke | F03D 7/0224 700/287 |
| 2009/0238664 A1 | 9/2009 | Murata et al. | |

FOREIGN PATENT DOCUMENTS

| | | |
|---|---|---|
| JP | 9136705 A | 5/1997 |
| JP | 2000153907 A | 6/2000 |
| JP | 2000215177 A | 8/2000 |
| JP | 2001233411 A | 8/2001 |
| JP | 2001282762 A | 10/2001 |
| JP | 2005107819 A | 4/2005 |
| JP | 3797102 B2 | 7/2006 |
| JP | 2007110612 A | 4/2007 |
| JP | 2009227415 A | 10/2009 |
| JP | 4427739 B2 | 3/2010 |

* cited by examiner

FACILITY CONTROL SYSTEM AND FACILITY CONTROL METHOD

BACKGROUND OF THE INVENTION

1. Field of the Invention

The present invention relates to a facility control system comprising an apparatus controller that controls an operation of a facility apparatus, a first-layer computer that executes a first-layer program for issuing an apparatus operating command for the facility apparatus to the apparatus controller that the first-layer computer is assigned to and for managing an operation result of the facility apparatus transmitted from the apparatus controller, a second-layer computer that executes a second-layer program for issuing a task command to the first-layer computer in order to cause the facility apparatus required to process a task request to be operated in accordance with the task request which is a request for an operation that is to be accomplished by operating the facility apparatus, and for managing a result of a task that is related to the task request based on the operation result of the facility apparatus transmitted from the first-layer computer, as well as to a facility control method using such a facility control system.

2. Description of the Related Art

Facility control systems such as one described above are used, for example, in a distribution facility that includes, as facility apparatuses, an automated warehouse having stacker cranes each of which transfers an article between an article storage rack and itself, sorting carriages for transporting articles along a predetermined track, storing-and-retrieving conveyors for storing and retrieving articles between carrying-in-and-out locations for the stacker cranes in the automated warehouse and carrying-in-and-out locations for the sorting carriages, and receiving-and-delivering conveyors for receiving and delivering articles between the carrying-in-and-out locations for the sorting carriages and article shipment locations, etc.

The facility control system in such distribution facility includes computers (first-layer computers) each of which runs a computer program (first-layer program) that issues apparatus operating commands for the facility apparatuses to the apparatus controllers which control operations of the facility apparatuses and that manages the operation results of the facility apparatuses transmitted from the apparatus controllers, and a computer (second-layer computer) which runs a computer program (second-layer program) that issues task commands to the first-layer computers and that manages the operation results of the facility apparatuses transmitted from the first-layer computers.

The second-layer computer issues a task command in accordance with a task request based on a storing-and-retrieving schedule, etc., to the first-layer computers that are assigned to the facility apparatuses that are required to operate in order to process the task command. And the first-layer computer issues apparatus operating commands for the facility apparatuses based on the task command, to the apparatus controllers that the first-layer computer is assigned to. (See, for example, JP Application Publication No. H09-136705 (Patent Document 1)).

In the facility control system of the distribution facility disclosed in Patent Document 1, the first-layer computers (control devices for the automated warehouse) issue the apparatus operating commands to the apparatus controllers each of which individually controls the operation of each apparatus, such as a stacker crane, based on the task command from the second-layer computer (facility controller) which manages the entire facility. And the first-layer computers are configured to manage article management information which is information that specifies the articles stored in the article storage unit based on information on operation results from the apparatus controllers, such that storage position information given uniquely to each of a plurality of article storage units of the article storage rack is associated with identifying information unique to each article stored in the storage position. This article management information is outputted to the second-layer computer through a communication line. And the second-layer computer is configured to perform inventory management based on the storage position information and on the identifying information unique to each article, by creating rack data (inventory data) by associating the storage position information with the unique identifying information.

Because the facility control system for the distribution facility disclosed in the above-described Patent Document 1 is configured in this manner, for example, if an abnormal condition occurs in the second-layer computer and even if normal operation of the second-layer computer is subsequently restored in such a manner that the data etc. that were stored before the occurrence of an abnormal condition were initialized, the rack data (inventory data) for inventory management can be reconstructed based on the article management information stored in the first-layer computers, which makes it possible to restore the system quickly.

However, while the inventory data can be recovered easily with such a configuration after an abnormal condition occurs in the second-layer computer, no facility controller would be available until the recovery work is completed; thus, for example, it is necessary to manually issue task commands to the first-layer computers and thus lowering of the operation efficiency of the entire distribution facility cannot be avoided.

In the field of information processing systems using a computer, non-stop computer systems have been implemented to avoid the problem that it becomes impossible to continue a process that a program executed by the computer has been performing if an abnormal condition occurs in the computer executing the program for performing the process. A non-stop computer system includes a computer under operation (referred to as an operational computer) and a computer (referred to as a standby computer) whose sole purpose is to provide the functions of the operational computer in substitution therefor. And when an abnormal condition occurs in an operational computer, a failover is performed from the operational computer to the standby computer, in which the standby computer takes over the process performed by the program that had been executed by the operational computer in which the abnormal condition occurred. Thus, the process is continued to be performed without interrupting or stopping the information processing system. Such a non-stop computer system is called a high availability cluster.

When employing a high availability cluster, a mutually monitoring mechanism called Heartbeat, etc. is provided between the operational computer and the standby computer to detect an abnormal condition. However, in a high availability cluster, because, among other reasons, the mutually monitoring mechanism may misinterpret a momentary disruption of the network communication between the operational computer and the standby computer as an abnormal condition occurring in the operational computer, there is a possibility that a condition (so-called split-brain syndrome) may occur in which the standby computer is automatically activated by the system despite the fact that the operational computer is functioning normally.

In a facility control system such as one disclosed in Patent Document 1 described above, when a high availability cluster is introduced, in which the second-layer computer is the operational computer, there would be two second-layer computers that execute the same second-layer program if and when the above-described split-brain syndrome occurs because, for example, a momentary disruption of the network communication between the second-layer computer and the standby computer is misinterpreted as an abnormal condition occurring in the second-layer computer. Then, there is a possibility that a plurality of task commands may be issued to the first-layer computer. When a plurality of task commands are issued to the first-layer computer in this manner, the same transport request may be issued again despite the fact that the transport operation of an article has been completed, which may lead to a lowering of the processing efficiency of the entire facility control system. For this reason, there has been a need, in the field of facility control systems, for a non-stop computer system that can reliably prevent occurrences of the split-brain syndrome and thus, can reduce a lowering of the processing efficiency of the entire facility control system. In addition, in a high availability cluster, it is necessary to provide, for a given operational computer, a standby computer whose sole purpose is to substitute for the operational computer, which lead to an increase in the overall cost for the facility.

SUMMARY OF THE INVENTION

To this end, in a facility control system having a computer that issues a task command to a computer that controls an operation of a facility apparatus, there is a need for such a system that can reduce a lowering of the processing efficiency of the entire facility control system, even when an abnormal condition occurs in the computer that issues the task command, and that can reduce an increase in the costs of the facility.

A facility control system in accordance with the present invention comprises:

an apparatus controller that controls an operation of a facility apparatus;

a first-layer computer that executes a first-layer program for issuing an apparatus operating command for the facility apparatus to the apparatus controller that the first-layer computer is assigned to and for managing an operation result of the facility apparatus transmitted from the apparatus controller;

a second-layer computer that executes a second-layer program for issuing a task command to the first-layer computer in order to cause the facility apparatus required to process a task request to be operated in accordance with the task request which is a request for an operation that is to be accomplished by operating the facility apparatus, and for managing a result of a task that is related to the task request based on the operation result of the facility apparatus transmitted from the first-layer computer;

a selection processing portion that selects, based on a manual operation, whether to cause the first-layer computer to execute the second-layer program that had been executed by the second-layer computer, when an abnormal condition occurs in the second-layer computer;

a substitute command output processing portion that issues a substitute command for executing, as a substitute-execution-subject program, the second-layer program that had been executed by the second-layer computer in which the abnormal condition occurred;

wherein the substitute command output processing portion is configured to output the substitute command in accordance with a selection information selected by the selection processing portion, wherein the first-layer computer is configured to execute the substitute-execution-subject program based on the substitute command that the substitute command output processing portion outputs.

That is, whether the first-layer computer is to be caused to execute the second-layer program that the second-layer computer concerned had been executing is selected based on a manual operation, when an abnormal condition occurs in the second-layer computer. And in accordance with the selection information, the first-layer computer executes the second-layer program that had been executed by the second-layer computer in which the abnormal condition occurred.

In other words, since whether the first-layer computer is to be caused to execute the second-layer program that had been executed by the second-layer computer can be selected based on a user's manual operation, the first-layer computer can be caused to execute the second-layer program after the user has confirmed that an abnormal condition occurred in the second-layer computer and that the second-layer program executed in the second-layer computer is not functioning. Therefore, this avoids a situation where a system misinterprets that an abnormal condition has occurred in the second-layer computer, for some reason (for example, because a momentary disruption occurred in the network between the first-layer computer and the second-layer computer) despite the fact that no abnormal condition has in fact occurred in the second-layer computer, and where the second-layer program that had been executed by the second-layer computer is automatically executed by the first-layer computer, which results in the same second-layer program being executed by both the first-layer computer and the second-layer computer.

When the same second-layer program is executed by both the first-layer computer and the second-layer computer as described above, there is a possibility that, after a task command is issued to the first-layer computer, the task command may be issued again to the first-layer computer. Thus, an apparatus operating command is issued for the same operation and the facility apparatus ends up operating accordingly, despite the fact that the operation of the facility apparatus required to process the operations in the task command has been completed, which may lead to a lowering of the processing efficiency of the entire facility control system. In contrast, with the configuration described above, the situation where the same second-layer program is executed by both the first-layer computer and the second-layer computer can be avoided so that issuance of duplicate task commands from both the second-layer computer and the first-layer computer is prevented, which reduces lowering of the processing efficiency of the entire facility control system.

Moreover, with the configuration described above, when an abnormal condition occurs in the second-layer computer, because the first-layer computer can be caused to execute the second-layer program that had been executed by the second-layer computer, that is, because the first-layer computer, which has already been used in the facility control system, can substitute for the second-layer computer in which the abnormal condition occurred, it is unnecessary to provide an additional computer whose sole purpose is to substitute for the second-layer computer, which can reduce an increase in the costs of the facility.

In short, with the configuration described above, in a facility control system having a computer that issues a task command to a computer that controls an operation of a facility apparatus, a system can be provided that can reduce a lowering in the processing efficiency of the entire facility control system, even when an abnormal condition occurs in the computer that issues the task command, and that can reduce an increase in the costs of the facility.

The technical features of the facility control system in accordance with the present invention having each configuration described above may be applied to a facility control method. And such a method is within the scope of the present invention. Such a facility control method can also provide the functions and effects associated with the facility control system described above.

That is, a facility control method in accordance with the present invention is a method using a facility control system having an apparatus controller that controls an operation of a facility apparatus; a first-layer computer that executes a first-layer program for issuing an apparatus operating command for the facility apparatus to the apparatus controller that the first-layer computer is assigned to and for managing an operation result of the facility apparatus transmitted from the apparatus controller; and a second-layer computer that executes a second-layer program for issuing a task command to the first-layer computer in order to cause the facility apparatus required to process a task request to be operated in accordance with the task request which is a request for an operation that is to be accomplished by operating the facility apparatus, and for managing a result of a task that is related to the task request based on the operation result of the facility apparatus transmitted from the first-layer computer;

the facility control method comprises the following steps that are performed by the facility control system:

a selection processing step of selecting, based on a manual operation, whether to cause the first-layer computer to execute the second-layer program that had been executed by the second-layer computer, when an abnormal condition occurs in the second-layer computer;

a substitute command output processing step of issuing a substitute command for executing, as a substitute-execution-subject program, the second-layer program that had been executed by the second-layer computer in which the abnormal condition occurred;

wherein in the substitute command output processing step, a substitute command for causing the first-layer computer to execute the substitute-execution-subject program is issued in accordance with selection information selected in the selection processing step.

DESCRIPTION OF THE PREFERRED EMBODIMENTS

A facility control system in accordance with the present invention is described next where the control system is applied to a distribution facility 1, with reference to the drawings.

Figure 1:
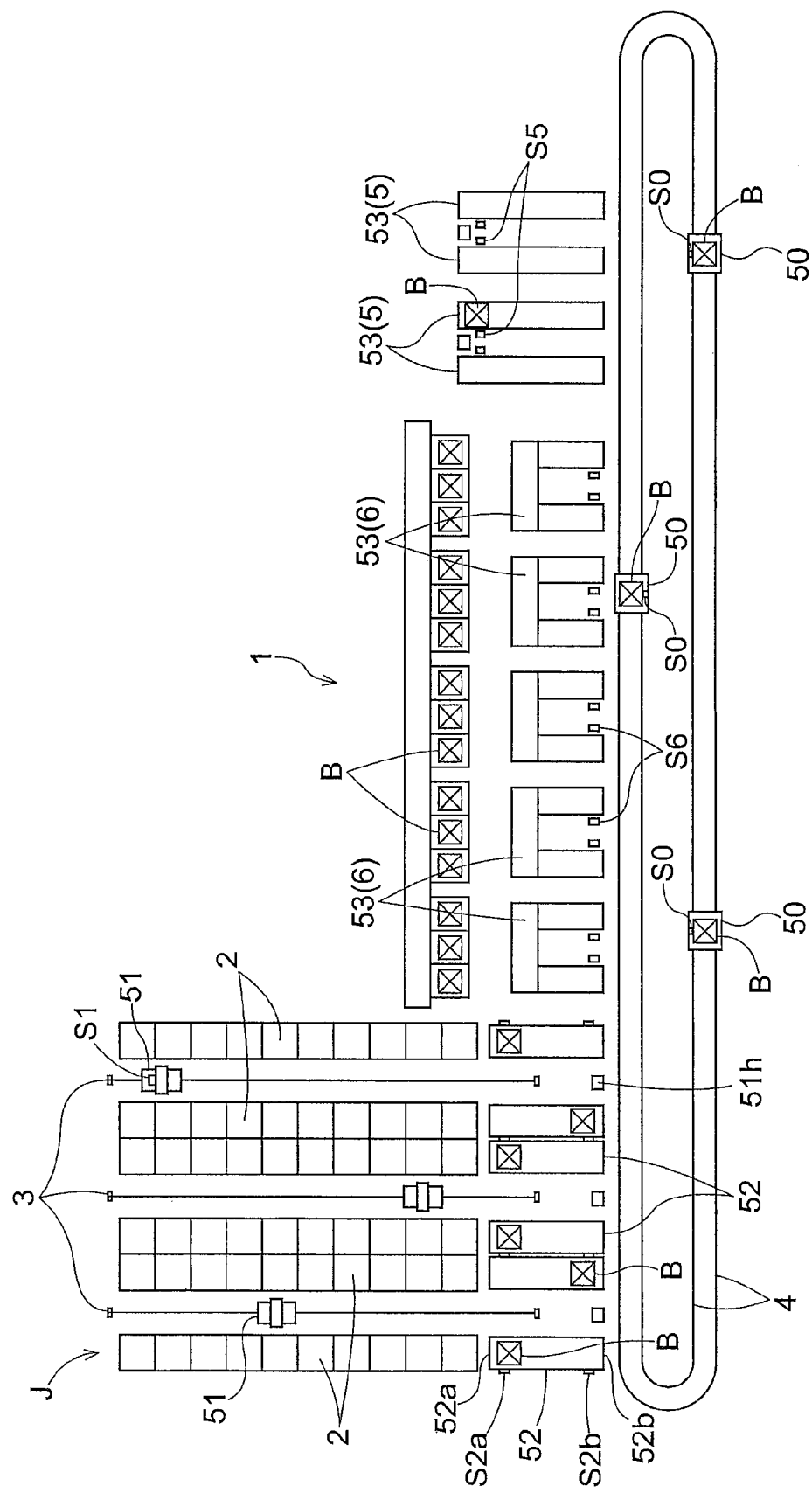
FIG. 1 is an overall plan view of a distribution facility.

As shown in FIG. 1, this distribution facility 1 includes an automated warehouse J which primarily includes article storage racks 2 and stacker cranes 51, storing-and-retrieving conveyers 52 each of which transfers an article B to or from the stacker crane 51 provided to the automated warehouse J, receiving-and-delivering conveyers 53 which function as receiving portions for receiving articles B from outside the facility or as delivering portions for delivering articles B to outside the facility, and sorting carriages 50 which can travel along the travel rail 4 and which support and transport articles between the storing-and-retrieving conveyers 52 and the receiving-and-delivering conveyers 53.

Each article storage rack 2 has a plurality of article storage units that are arranged in the vertical and lateral direction (that is, in the vertical direction and a right-and-left direction) such that the front side of the article storage rack 2 is open for taking articles in or taking articles out of the article storage rack 2. A plurality of the article storage racks 2 are provided such that the front side of a rack 2 faces the front side of the other rack 2 and such that the article storage racks 2 are spaced apart from each other. In addition, a travel rail 3 on which a stacker crane 51 travels is provided between any two article storage racks 2 that face each other.

Each stacker crane 51 includes a traveling carriage having travel wheels which can travel on the travel rail 3 and a vertical movement guiding mast arranged vertically on the traveling carriage, and thus is configured to allow a vertically movable platform to move vertically while the platform is supported by the vertical movement guiding mast. And the stacker crane 51 is configured to transfer an article between a transfer device provided to the vertically movable platform and any article storage unit of the article storage rack 2.

A ground side controller 51h for controlling operation of the stacker crane 51 is provided in one end area of each travel rail 3. While not shown, a movable body side controller is provided to the traveling carriage of each stacker crane 51. And the ground side controller 51h and the movable body side controller are configured to be able to communicate with each other by means of infrared lights etc. The stacker crane controller 51C is configured with, or defined by, the ground side controller 51h and the movable body side controller.

Provided close to the transfer device of each stacker crane 51 is an article identifying sensor S1 which reads in identifying information (information recorded in a bar code, an IC tag, etc.) of articles. And the article identifying sensor S1 is configured such that the information it reads in is inputted into the stacker crane controller 51C.

Each storing-and-retrieving conveyer 52 has a rack-side storing-and-retrieving location 52a and a carriage-side storing-and-retrieving location 52b. Each rack-side storing-and-retrieving location 52a is an end portion on the side of the article storage rack 2 where an article can be transferred to or from the stacker crane 51. Each carriage-side storingand-retrieving location 52b is an end portion on the side of the travel rail 4 for the sorting carriages 50 where an article can be transferred to or from the sorting carriage 50. And the carriage-side storing-and-retrieving location 52b is located at a lateral side of the travel rail 4, to be more specific. And the storing-and-retrieving conveyer 52 is configured such that its operation is controlled by the storing-and-retrieving conveyer controller 52C.

An article identifying sensor S2a, S2b for reading in identifying information (information recorded on a bar code, an IC tag, etc.) of articles is provided at each of the rack-side storing-and-retrieving location 52a and the carriage-side storing-and-retrieving location 52b.

Each sorting carriage 50 is configured to be able to travel while sensing its travel position by means of a known method such as a rotary encoder or a dog detector, and is configured such that its operation is controlled by the sorting carriage controller 50C. Provided close to an article support portion provided to the sorting carriage 50 is a carriage article sensor S0 which reads in identifying information (information recorded on a bar code, an IC tag, etc.) of the article B supported and transported by the sorting carriage 50.

The receiving-and-delivering conveyors 53 include receiving conveyors 5 each of which functions as a receiving portion for receiving articles B from outside the facility, and delivering conveyors 6 each of which functions as a delivering portion for delivering articles B to outside the facility. And the system is configured such that operation of each of the receiving conveyors 5 and the delivering conveyors 6 is controlled by a receiving-and-delivering conveyor controller 53C. In addition, article identifying sensor S5, S6 for reading in identifying information (information recorded on a bar code, a wireless IC tag, etc.) of articles B is provided at each of an end portion, on the upstream side in the article transport direction, of each receiving conveyor 5, and an end portion, on the upstream side in the article transport direction, of each delivering conveyor 6.

In other words, the distribution facility 1 includes, as facility apparatuses, the stacker cranes 51, the storing-and-retrieving conveyers 52, the receiving-and-delivering conveyors 53, and the sorting carriages 50. Also the distribution facility 1 includes the stacker crane controllers 51C, the storing-and-retrieving conveyer controllers 52C, the receiving-and-delivering conveyor controllers 53C, and the sorting carriage controllers 50C, as apparatus controllers C each of which is provided for, or in association with, each facility apparatus and each of which controls the operation of the respective facility apparatus.

Each apparatus controller C includes, for example, a microcomputer, etc. and is configured to be able to exchange data with each facility apparatus by means of a communication interface, such as, a serial interface and an infrared transmission interface. The communication interface is not limited to those described above. And various kinds of interfaces may be used instead as long as real-time communication can be reliably performed.

Figure 2:
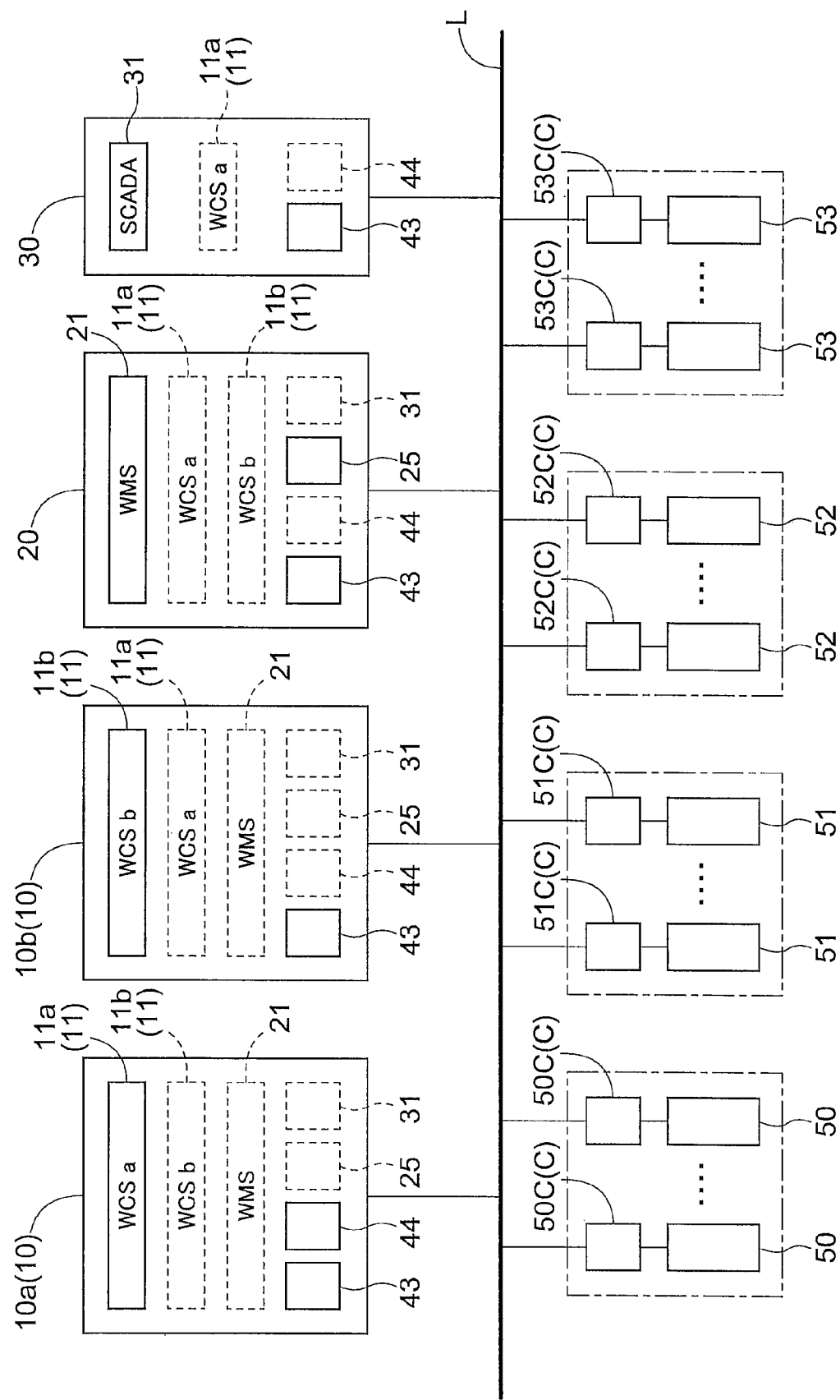
FIG. 2 shows functional blocks of a facility control system as well as its network connections.

The facility control system includes the apparatus controllers C, first-layer computers 10, and a second-layer computer 20. As shown in FIG. 2, in the present embodiment, the facility control system includes a plurality of the apparatus controllers C, a plurality of the first-layer computers 10 (two first-layer computers in the example shown in FIG. 2), and a single second-layer computer 20. Each first-layer computer 10 executes a first-layer program 11 for issuing apparatus operating commands for the facility apparatuses, to the apparatus controllers C that the first-layer computer 10 is assigned to, and for managing the operation results of the facility apparatuses transmitted from the apparatus controllers C. Each first-layer computer 10 executes one or more first-layer program or programs 11. In addition, each first-layer computer 10 is assigned to one or more apparatus controller or controllers C. And when the facility control system includes a plurality of apparatus controllers C, the first-layer computer 10 is assigned to all or a part of the plurality of apparatus controllers C. The second-layer computer 20 executes a second-layer program 21 for issuing a task command to the first-layer computers 10 in order to operate the facility apparatuses that are required to process a task request, in accordance with the task request which is a request for an operation that is to be accomplished by operating the facility apparatuses, and for managing the results of the operations for the task request based on the operation results of the facility apparatuses transmitted from the first-layer computers 10. The second-layer computer 20 issues one or more command or commands to one or more first-layer computer or computers 10 (more than one computers in the present example).

Each first-layer computer 10 is configured to execute the first-layer program 11 to issue an apparatus operating command to the apparatus controllers C which the first-layer computer 10 is assigned to in accordance with the task command from the second-layer computer 20.

In addition, the facility control system includes a monitoring computer 30. In present embodiment, the facility control system includes a single monitoring computer 30 as shown in FIG. 2. The monitoring computer 30 executes a monitoring program 31 which collects and displays information about operational states of the facility apparatuses from the first-layer computers 10 or the second-layer computer 20.

Next, the facility is described with reference to FIG. 2 which shows the configurations of, and the network connections among, the apparatus controllers C, the first-layer computers 10, and the second-layer computer 20 which are included in the facility control system as well as the monitoring computer 30 which accompanies the facility control system. Note that FIG. 2 merely illustrates one example of a facility control system. And one first-layer computer 10 or more than three first-layer computers 10 may be provided instead. And more than two monitoring computers 30 may be provided.

As shown in FIG. 2, the apparatus controllers C, the first-layer computers 10, the second-layer computer 20, and the monitoring computer 30 are mutually connected by the communication lines L through a network interface. The communication lines L are configured, for example, as a LAN having a star topology, and are configured to provide communication using TCP/IP.

In addition, the segment configuration within the LAN may be of any type so long as the apparatus controllers C, the first-layer computers 10, the second-layer computer 20, and the monitoring computer 30 can mutually communicate. And it is not necessary for all computers illustrated in FIG. 2 to belong to the same segment.

FIG. 2 shows an example of a configuration in which a first-layer computer 10a for the conveyors which is assigned to the storing-and-retrieving conveyers 52 and a first-layer computer 10b for the cranes which is assigned to the stacker cranes 51 are provided as the first-layer computers 10.

In the present embodiment, the first-layer computers 10 also include, among other first-layer computers, a first-layer computer that is assigned to the sorting carriages 50, and a first-layer computer that is assigned to the receiving-anddelivering conveyors 53 in addition to the first-layer computers described above. However, descriptions for these additional first-layer computers 10 are omitted here since they have the same configurations as the first-layer computer 10a for the conveyors and the first-layer computer 10b for the cranes.

Comparatively inexpensive computers, such as, personal computers, or PC servers, etc., that are not dedicated computers may be used as the first-layer computer 10a for the conveyors and the first-layer computer 10b for the cranes. Each of the first-layer computer 10a for the conveyors and the first-layer computer 10b for the cranes includes a CPU, main memory, a hard disk, a display, a keyboard, a pointing device (mouse), etc., as well as a network interface.

A first-layer program 11a for the conveyors for the storing-and-retrieving conveyors and a first-layer program 11b for the cranes for the stacker cranes are installed in each of the first-layer computer 10a for the conveyors and the first-layer computer 10b for the cranes. Further, installed in each of the first-layer computer 10a for the conveyors and the first-layer computer 10b for the cranes are a second-layer program 21, a data base program 25 which the second-layer program 21 uses, a service switching program 43 which functions as a selection processing portion and a substitute command output processing portion, a message queue program 44 which functions as a buffer processing portion, and a monitoring program 31.

Among the above-mentioned installed programs, the first-layer program 11a for the conveyors for the storing-and-retrieving conveyors and the service switching program 43 are being executed by, and in, the first-layer computer 10a for the conveyors during a normal operation (that is, when a program that should be executed by another computer is NOT executed on behalf of such another computer).

In addition, among the above-mentioned installed programs, the first-layer program 11b for the cranes for the stacker cranes, the service switching program 43, and the message queue program 44 are executed by the first-layer computer 10b for the cranes during a normal operation.

A computer having a higher processing capacity than the first-layer computer 10 is used for the second-layer computer 20. Incidentally, the processing capacity as referred to above is a concept that is defined relatively in terms of the calculation speed of the CPU, or hard disk access speed, etc. The above-mentioned second-layer program 21 and a data base program 25 that the second-layer program 21 uses are installed in the second-layer computer 20. Further, the service switching program 43, the message queue program 44, the monitoring program 31, the first-layer program 11a for the conveyors, and the first-layer program 11b for the cranes are installed in the second-layer computer 20.

Among the above-mentioned programs installed, the second-layer program 21, the data base program 25, and the service switching program 43 are executed by the second-layer computer 20 during a normal operation.

A computer that has a comparable processing capacity as, or a lower processing capacity than, the first-layer computer 10 may be used as a monitoring computer 30. A monitoring program 31 is installed in the monitoring computer 30. Further, the service switching program 43, the message queue program 44, and the first-layer program 11a for the conveyors are installed in the monitoring computer 30.

Among the above-mentioned programs installed, the monitoring program 31 and the service switching program 43 are executed by the monitoring computer 30.

The processes or tasks performed by each program installed in the first-layer computers 10, the second-layer computer 20, or the monitoring computer 30 are described next. Each program is stored in memory that can be accessed by the computer in which the program in question is installed, and is executed by the arithmetic processing unit which the computer in question includes.

The message queue program 44 is installed in all of the above-mentioned first-layer computers 10, the second-layer computer 20, and the monitoring computer 30, and is configured to be executed by any one of these computers (e.g., first-layer computer 10b for the cranes). The message queue program 44 stores or accumulates a task command data transmitted from the second-layer computer 20 to the first-layer computers 10 as well as data on the operation results of the facility apparatuses transmitted from the first-layer computers 10 to the second-layer computer 20 in a message queue which includes a first-in-first-out (FIFO) memory area, and is configured to use IP address assigned to the first-layer computers and the second-layer computer as identifying information to relay the exchange of the data among these computers based on the IP address.

More specifically, all of the first-layer computers 10 and the second-layer computer 20 transmit the task command data and operation result data to a first-layer computer 10b for the cranes that is functioning as the computer by which the message queue program 44 is being executed (referred to hereinafter as the "message-queue-program-executing computer"). Upon receiving the task command data and operation result data, the first-layer computer 10b for the cranes then stores or accumulates them in the message queue of the message queue program 44.

Incidentally, the stored task command data and operation result data are saved in the message queue for a set period, which is a sufficiently shorter time period than the amount of time required for switching, and are deleted from the message queue after the set period elapses.

The second-layer program 21 transmits data (referred to as task command data) related to a task command for commanding the transport of an article to the IP address assigned to the first-layer computer 10b for the cranes which is the message-queue-program-executing computer, in accordance with a task request (for example, "ship ten goods α to Customer A", etc.) generated by a superordinate input device or system. The task command data consists of, or includes, identifying information (article ID) of the article to be transported, a transport initial position (or "From" data) of the article, and a transport target position (or "To" data) of the article. Upon receiving the task command data, the first-layer computer 10b for the cranes uses the message queue program 44 described above to store or accumulate the task command data in the message queue formed in the memory area of the first-layer computer 10b for the cranes.

The first-layer program 11a for the conveyors executed by the first-layer computer 10a for the conveyors processes the task command data transmitted from the first-layer computer 10b for the cranes and stored in the message queue of the message queue program 44 as a task command in the order of arrival. That is, an apparatus operating command is issued to the apparatus controllers C in accordance with task command data in order to operate the facility apparatuses required to process a task request.

Since a task command for task command data is carried out using one or more of the facility apparatuses of different kinds in the distribution facility 1, one or more first-layer computer or computers 10 controls, or control, the facility apparatuses that the computer or computers 10 is, or are, assigned to for one task command data.

More specifically, when the contents of the task command data are "transport article B having article ID β from a certain article storage unit in the article storage rack 2 to the delivering conveyor 6", the first-layer program 11b for the cranes for stacker crane 51 first issues an apparatus operating command for operating a stacker crane 51 to the stacker crane controller 51C in order to transport the article B having article ID β from an article storage unit to a rack-side storing-and-retrieving location 52a of the storing-and-retrieving conveyor 52.

When the stacker crane 51 finishes transferring the article B having article ID β to the rack-side storing-and-retrieving location 52a of the storing-and-retrieving conveyor 52, the stacker crane controller 51C reads in the article ID of the article with the article identifying sensor S2a provided at the rack-side storing-and-retrieving location 52a, and transmits the article ID to the first-layer program 11a for the conveyors for the storing-and-retrieving conveyor 52.

When the article ID received from the stacker crane controller 51C is the article ID β for which the transport is commanded by the task command data, the first-layer program 11a for the conveyors issues an apparatus operating command for transporting the article B placed in the storing-and-retrieving conveyor 52 from the rack-side storing-and-retrieving location 52a to the carriage-side storing-and-retrieving location 52b in order to have the article B transported to the transport target position.

When the article B reaches the carriage-side storing-and-retrieving location 52b, the storing-and-retrieving conveyor controller 52C reads in the article ID of the article with the article identifying sensor S2b provided at the carriage-side storing-and-retrieving location 52b, and transmits the article ID to the first-layer program 11 that is assigned to the sorting carriage 50 that takes over the transport operation of the article B.

As such, the article is transported in such a manner that the first-layer computers 10 issue task commands to the apparatus controllers C which they are assigned to, until the article B having the article ID β which is the subject of the task command data arrives at the transport target position.

In addition, when the operation required to process the task commanded by the task command data is completed, each of the apparatus controllers C submits its operation result. In other words, each apparatus controller C transmits an identification number unique to each task command data as well as data (referred to, hereafter, as operation result data) indicating the completion of the operation that corresponds to the task command data, to the first-layer computer 10 that executes the first-layer program 11 that is assigned to the apparatus controller C in question.

Each first-layer program 11 transmits the operation result data received from the apparatus controller C to the IP address assigned to the first-layer computer 10b for the cranes that is the message-queue-program-executing computer.

Upon receiving the operation result data, the first-layer computer 10b for the cranes stores or accumulates the operation result data in the message queue of the message queue program 44, and transmits it to the second-layer computer 20 which is predetermined as the receiver of the data. The second-layer program 21 executed by the second-layer computer 20 processes the operation result data that are transmitted from the message-queue-program-executing computer and that are stored in the message queue of the message queue program 44, in the order that the data are stored.

More specifically, the second-layer program 21 is configured to, upon receiving the operation result data, issue a command to the data base program 25 executed by the same computer that executes the second-layer program 21 to update, as required, the data base that associates the identification numbers of the task command data with the operation result data from the apparatus controllers C. And the second-layer program 21 can be aware of, or keep track of, the transport operation performed by the facility apparatus that the processing for the task command data has been completed up to by referring to the data base.

The monitoring program 31 is executed by the single monitoring computer 30 (a server) provided in the system. More than one such monitoring computers 30 may be provided. A plurality of terminals for monitoring may be connected to the monitoring computer 30. And the monitoring terminals display statistical data, etc., which the monitoring program 31 processed. The monitoring program 31 is configured to be able to collect information from one or more of the apparatus controllers C, the first-layer programs 11, and the second-layer program 21 to monitor the state of some or all of the facility apparatuses and the facility control system. As an example, the monitoring program 31 is configured to display, on the display unit of the monitoring computer 30 or on the monitoring terminals, various kinds of information such as information on the operating positions of the stacker cranes 51 and the sorting carriages 50 that function as the facility apparatuses, their MTBF (Mean Time Between Failures), or failure information of the storing-and-retrieving conveyers 52, etc.

The service switching program 43 is configured: to identify a program that has been executed by a computer in which an abnormal condition occurred as a program that is the subject of execution ("substitute-execution-subject program") by a substitute computer; to carry out a selection processing step to select, based on an manual operation, whether to cause the substitute-execution-subject program to be executed by another computer; and to carry out a substitute command output processing step to issue a substitute command for causing the another computer to execute the substitute-execution-subject program. The manual operation is performed by a user by using, for example, an input device, such as a keyboard and a pointing device (e.g. a mouse), provided to the computer that is executing the service switching program 43. And the service switching program 43 selects whether to cause the substitute-execution-subject program to be executed by another computer, based on the result of the selection (more specifically, on an output signal from the input device) by the manual operation. In the present embodiment, while the "selection processing portion" in accordance with the present invention is configured, or defined by, a program (more specifically the service switching program 43) as described above, the "selection processing portion" in accordance with the present invention may be configured by both a program (software) and hardware (input device).

More specifically, the service switching program 43 includes a background execution portion that is executed in the background and a user interface portion which displays information to a user and which is used to input a command from the user. The service switching program 43 is installed in one or more computer or computers. And the computer in which the service switching program 43 is installed performs the selection processing step and the substitute command output processing step. The computer in which the service switching program 43 is installed may be one or more of the first-layer computers 10, the second-layer computer 20, and the monitoring computer 30 included in the facility control system or may be other computer which belongs to the same network as these computers and which can communicate therewith (e.g., servers, such as an email server, a file server, or a job-oriented terminal etc.)

When an abnormal condition occurs in the second-layer computer 20, the service switching program 43 is configured to issue an identifying information take over command for causing a first-layer computer 10 to take over the IP address assigned to the second-layer computer 20 in question. This identifying information take over command is issued to the message queue program 44.

This allows the data transmitted and received by the second-layer computer 20 before the identifying information take over command was issued to be transmitted and received by the first-layer computer 10 which has taken over the IP address of the second-layer computer 20 after the identifying information take over command was issued. Therefore, the computers included in the facility control system can exchange information with no regard to the fact that the computers which the data is sent to and from which data is received have been changed between before and after the substitution of the computers.

The background execution portion is started or activated as a background process simultaneously with the startup of the computer in which the service switching program 43 is installed. In addition, the service switching program 43 transmits activation notice data which indicates that the service switching program 43 has been activated, at every set period (for example, every 5 seconds) since the activation, to all the computers in which the service switching program 43 is activated. Incidentally, the activation notice data are transmitted by the UDP multicast. And the background execution portion of the service switching program 43 is configured to update the list of activated computers, which list is used to manage activations and powering down of the computers in which the service switching program 43 is executed (referred to, hereinafter, as a service switching program executing computer), based on the received activation notice data.

Figure 4:
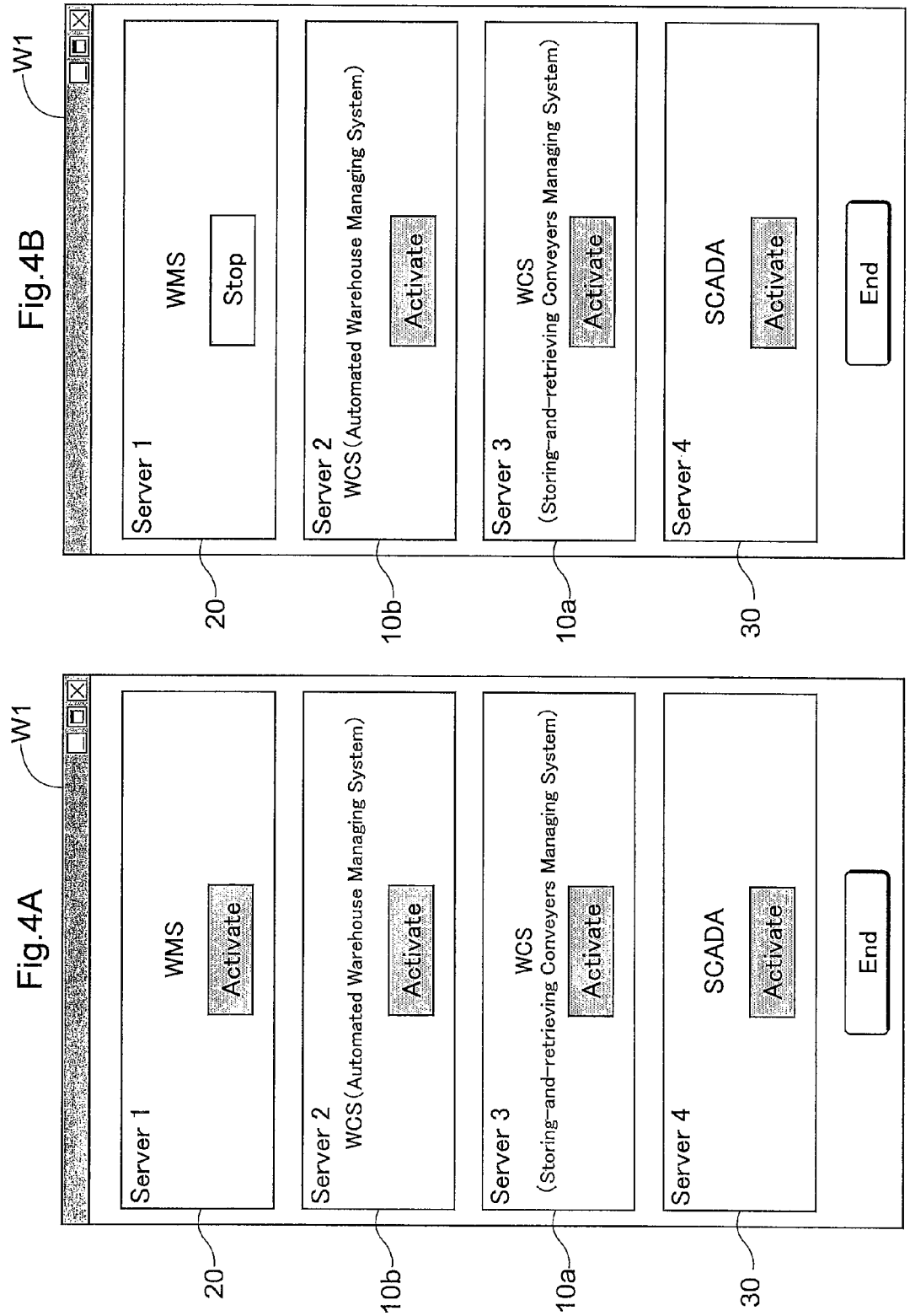
FIGS. 4A and 4B show an example of a display screen which displays a window generated by a selection processing portion.

The user interface portion is not executed during a normal operation, but is activated by an activation command from a user (for example, by clicking an icon, etc.). As shown in FIGS. 4A, 4B, 5A, and 5B, when the user interface portion is activated, information window W1 which shows a list of the activation state of each of the service switching program executing computers is displayed to the user on the display. FIG. 4A shows a state in which the first-layer computer 10a for the conveyors (server 3), the first-layer computer 10b for the cranes (server 2), the second-layer computer 20 (server 1), and the monitoring computer 30 (server 4) are operating normally. And FIG. 4B shows a state in which an abnormal condition occurred in the second-layer computer 20 (Server 1), and in which its second-layer program 21 has stopped running. That is, in the present specification, the expression "abnormal condition" of a computer means that a program which should be being executed in the computer in question in a normal operation has stopped running (i.e., the program is not functioning). The facility control system includes an abnormal condition detection processing portion (abnormal condition detection program) for detecting the abnormal condition of such computers.

In other words, the service switching program 43 includes the selection processing portion which selects whether to cause the second-layer program 21 that the second-layer computer 20 had been executing to be executed by a first-layer computer 10 and not causing the program 11 to be executed by the first-layer computer 10 based on a manual operation when an abnormal condition occurs in the second-layer computer 20 in question, and the substitute command output processing portion which issues a substitute command for causing the second-layer program 21 that was executed by the second-layer computer 20 in which the abnormal condition occurred to be executed as a substitute-execution-subject program, in accordance with selection information (information on the result of the selection) selected by the selection processing portion.

The flow of operations for when an abnormal condition occurs in the second-layer computer 20 and the second-layer program 21 stops running, until the second-layer program 21 is executed by another computer, is described next with reference to the flow chart in FIG. 3 as well as FIGS. 4A, 4B, 5A, and 5B which show how the display changes.

Figure 3:
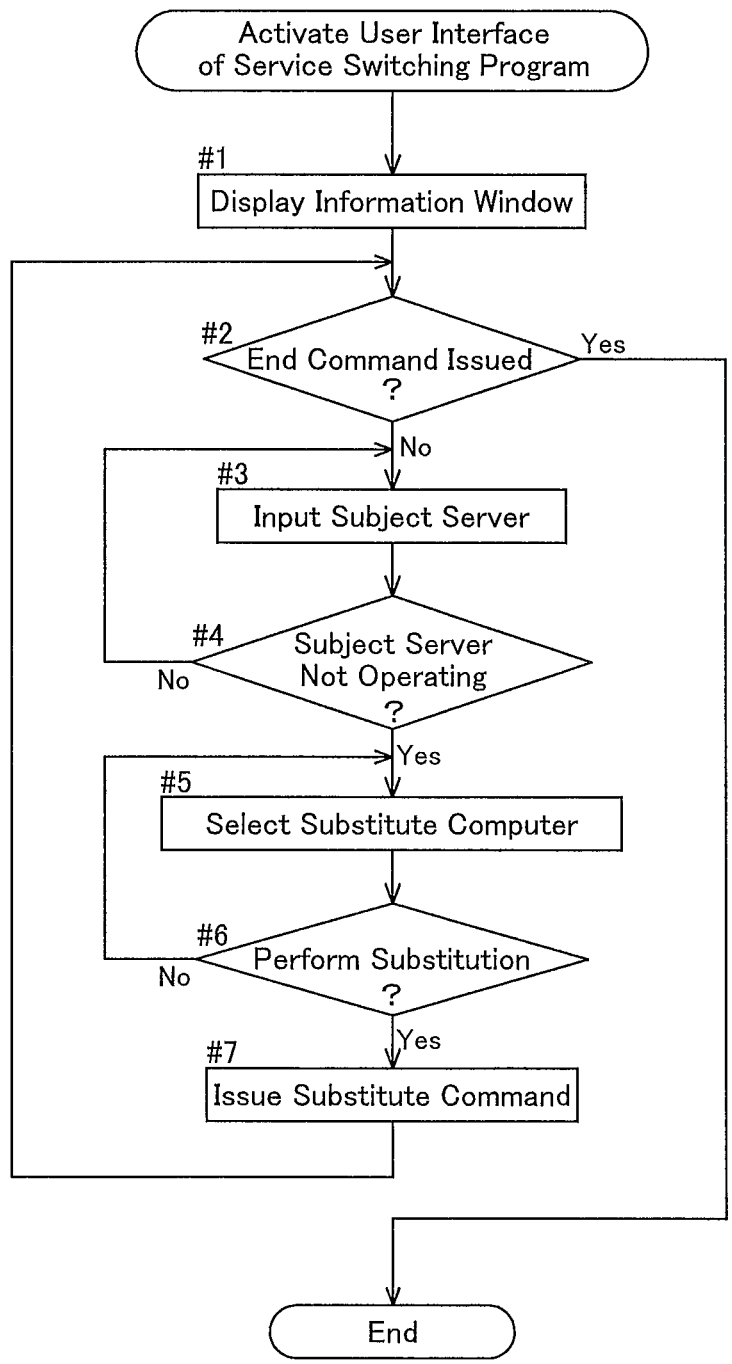
FIG. 3 is a flow chart for the processing at the time of a substitute execution.

As shown in FIG. 3, when the user activates the user interface portion of the service switching program 43 after learning that an abnormal condition occurred in the second-layer computer 20 and that the second-layer program 21 stopped running, by means of a warning display etc., an information window W1 shown in FIG. 4B is displayed (Step #1).

An "End" button is displayed in the information window W1. And a command to end the session can be issued (Step #2) when it is determined that there is no need to take any actions after checking the state of each computer in the information window W1.

If "End" is not selected in Step #2, the service switching program 43 proceeds to wait for an input that specifies the computer that is to be the subject of the process.

In the present embodiment, two first-layer computers 10 are provided and these two first-layer computers 10 are defined as substitution candidate computers.

Figure 5:
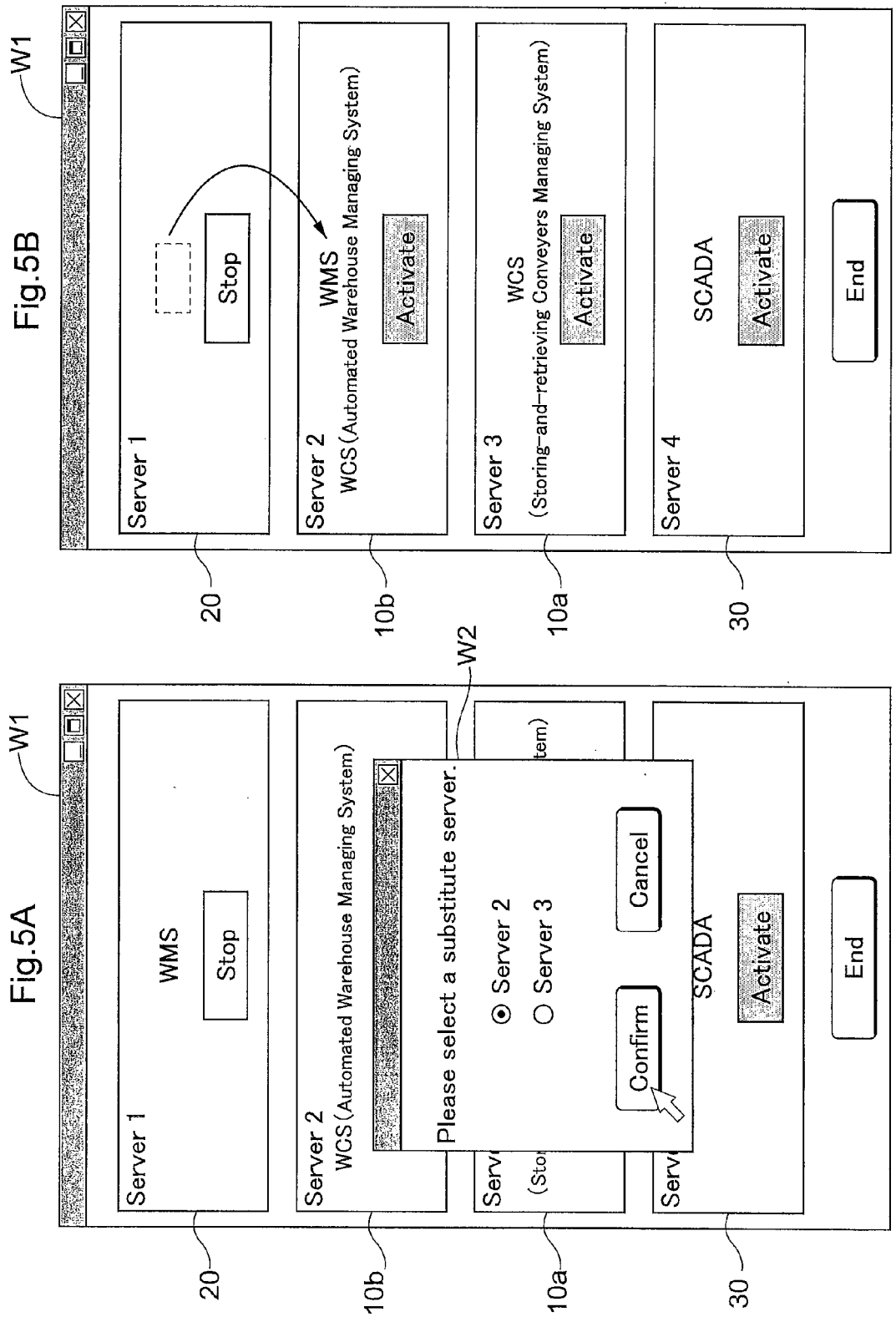
FIGS. 5A and 5B show an example of a display screen which displays a window generated by the selection processing portion.

When the user specifies the second-layer computer 20 in the information window W1 (for example, by placing the mouse pointer in the square area associated with the second-layer computer 20, and clicking a mouse button), a selection window W2 is displayed which displays the computers that can execute the second-layer program 21, as shown in FIG. 5A, based on the information managed by means of the list of activated computers and in which the computer to execute the second-layer program 21 is selected by a manual operation (i.e., the substitution computer is selected by an input).

In the selection window W2, the two first-layer computers 10 (namely, the first-layer computer 10a for the conveyors and the first-layer computer 10b for the cranes), which are defined as the substitution candidate computers, are displayed as computers that can be selected. That is, the service switching program 43 (selection processing portion) is configured to be able to select one of these computers for executing the substitute-execution-subject program based on a manual operation. And the service switching program 43 makes a selection to cause the computer that is selected by the manual operation to execute the substitute-execution-subject program (Steps #3-5).

It should be noted that, although FIGS. 4A, 4B, 5A, and 5B illustrate an example in which information on the four computers, namely, two first-layer computers 10, the second-layer computer 20, and the monitoring computer 30, is displayed in the information window W1, the information window W1 may be able to display information on more than four computers, for example, by scrolling the contents to be displayed or by changing the page.

When a user selects Server 2, (i.e., the first-layer computer 10b for the cranes) as the substitution computer and presses or click the "Confirm" button in the selection window W2, the service switching program 43 issues a substitute command for causing the first-layer computer 10b for the cranes to execute the second-layer program 21, that had been executed by the second-layer computer 20, as a substitute-execution-subject program based on this manual operation (more specifically, the pressing or clicking operation) (Step #6, and Step #7). That is, the service switching program 43 issues a substitute command for causing the first-layer computer 10b for the cranes to execute, as a substitute-execution-subject program, the second-layer program 21 that had been executed by the second-layer computer 20. Thus, the selection processing step is performed by the service switching program 43 whereas the substitute command output processing step is performed by the same program in accordance with the selection information selected in this selection processing step in the above-described manner. In addition, in light of the possibility that the second-layer program 21 that had been executed by the second-layer computer 20 in which the abnormal condition occurred did not stop running properly when it happened, it is desirable to have the second-layer computer 20 physically disconnected from the network (for example, by unplugging the LAN cable or by other method).

The service switching program 43 activates the second-layer program 21 installed in the first-layer computer 10b for the cranes as well as a data base program 25 that the second-layer program 21 uses, in accordance with the substitute command. In addition, dependency of program usage can be defined in the service switching program 43. And, in the example described above, since the second-layer program 21 uses the data base program 25, the service switching program 43 activates the data base program 25 first and then activates the second-layer program 21.

After activating the second-layer program 21 installed in the first-layer computer 10b for the cranes in accordance with the substitute command, the service switching program 43 assigns the IP address, that used to be assigned to the second-layer computer 20 in which the abnormal condition occurred, to the network interface of the first-layer computer 10b for the cranes as a virtual IP address. That is, the first-layer computer 10b for the cranes executes the second-layer program 21 that is a substitute-execution-subject program based on the substitute command that is issued or output by the service switching program 43 (substitute command output processing portion). In addition, it is also possible to assign the virtual IP address simultaneously with, or before, the activation of the second-layer program 21. From that point on, the computers in the facility control system exchange information with (i.e., transmit information to and receive information from) the second-layer program 21 executed by the first-layer computer 10b for the cranes in place of the second-layer program 21 which had been executed by the second-layer computer 20.

And the second-layer program 21 executed by the first-layer computer 10b for the cranes issues a task command to each first-layer computer 10 based on the task command data stored in the message queue through the message queue program 44 executed by the first-layer computer 10b for the cranes.

In addition, when an abnormal condition has occurred in the monitoring computer 30 and when the monitoring computer 30 is selected in Step #3, the computers which can execute the monitoring program 31 that had been executed by the monitoring computer 30 are displayed in the selection window W2. And the service switching program 43 selects the computer for executing the monitoring program 31 based on a manual operation (more specifically, selection of the substitution computer by the user) (Steps #3-#5). And as described above, when the user selects the substitution computer and presses or clicks the "Confirm" button in the selection window W2, the service switching program 43 issues, to the monitoring computer 30, a stop command for stopping the monitoring program 31 executed by the monitoring computer 30, and subsequently, issues the second substitution command for causing the monitoring program 31 which had been executed by the monitoring computer 30 in which the abnormal condition occurred to be executed by the substitution computer as a substitute-execution-subject program (Step #6, and Step #7). That is, the service switching program 43 issues, to the substitution computer, the second substitution command for causing the monitoring program 31 that had been executed by the monitoring computer 30 in which the abnormal condition occurred to be executed as a substitute-execution-subject program.

After activating the monitoring program 31 installed in the substitution computer (for example, the first-layer computer 10) in accordance with the second substitution command, the service switching program 43 assigns, as a virtual IP address, the IP address assigned to the monitoring computer 30 in which the abnormal condition occurred, to the network interface of the substitute computer (i.e., the computer that was selected among the first-layer computer 10a for the conveyors, the first-layer computer 10b for the cranes, and the second-layer computers 20). It is also possible to assign the virtual IP address simultaneously with, or before, the activation of the monitoring program 31. From that point on, the computers in the facility control system exchange information with (i.e., transmit information to and receive information from) the monitoring program 31 executed by the computer selected as the substitution computer, in place of the monitoring program 31 that had been executed by the monitoring computer 30.

The service switching program 43 is configured to return to the processing of Step #2 after the processing of Step #7 is finished. This is because there are cases where, in the event that abnormal conditions occur in more than one first-layer computers 10, the processing of Step #3-Step #7 needs to be repeated by the number of first-layer computers in which the abnormal conditions occurred. And the user interface portion can be ended by commanding an "End" in Step #2.

Figure 6:
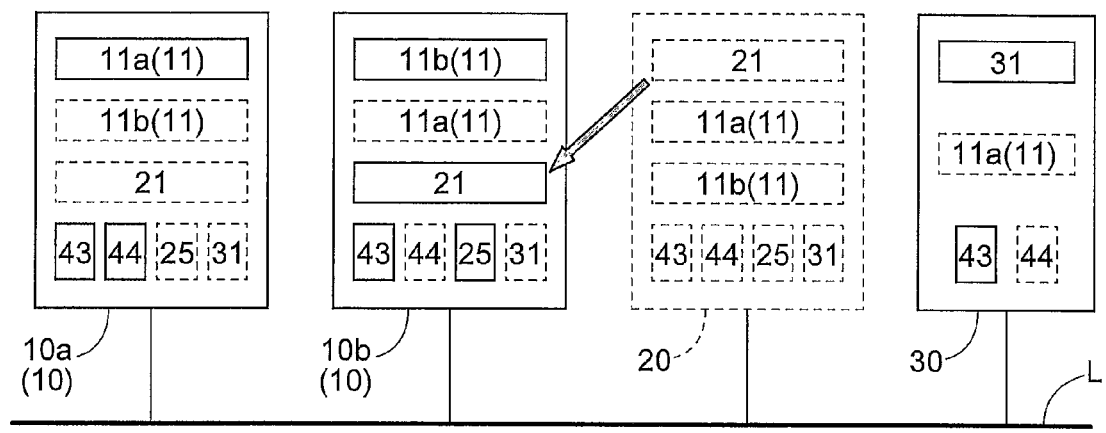
FIG. 6 shows an example of programs in a substituted state.

Examples of the patterns of a substitute command issued by the service switching program 43 is described next with reference to FIGS. 6 and 7. FIG. 6 illustrates a configuration of a substitution described with reference to the flow chart of FIG. 3 as well as FIG. 4A, FIG. 4B, FIG. 5A, and FIG. 5B, and shows a case where, in the event that an abnormal condition occurs in the second-layer computer 20, the second-layer program 21 that had been executed by the second-layer computer 20 in which the abnormal condition occurred is executed by the first-layer computer 10b for the cranes.

Figure 7:
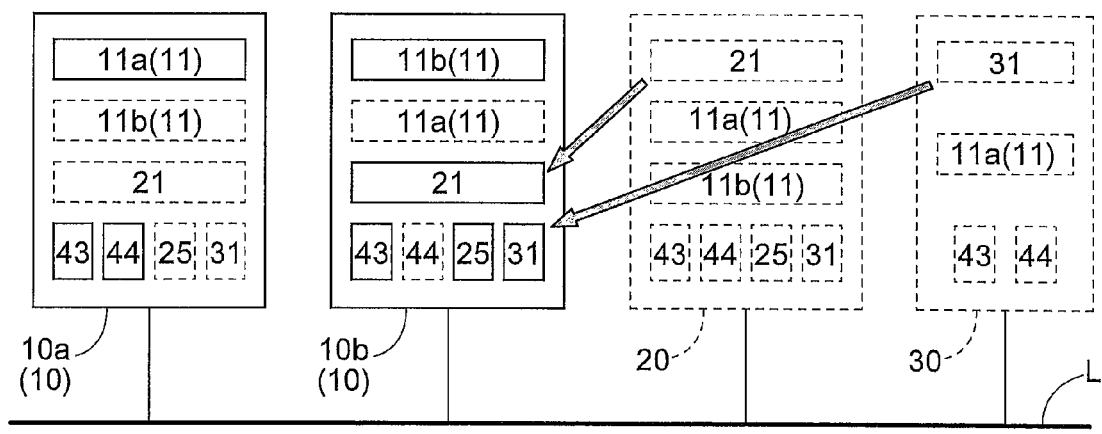
FIG. 7 shows an example of programs in a substituted state.

FIG. 7 shows a case where, in the event that an abnormal condition occurs in the second-layer computer 20 and in the monitoring computer 30, the first-layer computer 10b for the cranes is caused to execute, as substitute-execution-subject programs, the second-layer program 21 as well as the monitoring program 31.

Thus, with the facility control system in accordance with the present embodiment, when an abnormal condition occurs in the second-layer computer 20, a lowering of processing efficiency of the entire facility control system can be reduced by selecting, based on a manual operation, whether to cause the first-layer computer 10 to execute the second-layer program 21 that had been executed by the second-layer computer 20. And by causing the first-layer computer 10, which has already been in use in the facility control system, to execute the second-layer program 21 that had been executed by the second-layer computer 20 in which an abnormal condition occurred, a facility control system can be provided in which the cost of the facility can be reduced.

In an embodiment of the facility control system in accordance with the present invention, a plurality of the first-layer computers are preferably provided, wherein two or more of the first-layer computers are preferably defined as substitution candidate computers that can execute the second-layer program, and wherein the selection processing portion is preferably configured to be able to select one of the substitution candidate computers for executing the substitute-execution-subject program, based on a manual operation.

That is, the computer for executing the second-layer program can be selected among the two or more first-layer computers. Thus, for example, one of the first-layer computers that is appropriate for executing the second-layer program because, for example, it has surplus processing power, can be selected to execute the second-layer program so that a facility control system with high availability can be provided.

In an embodiment of the facility control system in accordance with the present invention, a high power computer with enough processing power to execute both the first-layer program and the second-layer program simultaneously and a low power computer which has less processing power than the high power computer are preferably used as the first-layer computers, wherein the high power computer is preferably defined as the substitute candidate computer.

That is, when a high power computer with enough processing power to execute both the first-layer program and the second-layer program simultaneously and a low power computer which has less processing power than the high power computer (e.g., a computer with enough processing power to execute only the first-layer program) are used as the first-layer computers, only the high power computer, between the high power computer and the low power computer, is defined as the substitute candidate computer and thus can be selected. This prevents the second-layer program from being executed by a low power computer which cannot execute both the first-layer program and the second-layer program simultaneously, which in turn, reduces a lowering of the processing efficiency of the entire facility control system.

In an embodiment of the facility control system in accordance with the present invention, the system preferably further comprises a buffer processing portion that relays data for the task command and data for the operation result communicated between the first-layer computer and the second-layer computer, wherein the buffer processing portion is preferably configured to relay an exchange of the data between the first-layer computer and the second-layer computer based on identifying information with the identifying information assigned to each of the first-layer computer and the second-layer computer, and wherein the substitute command output processing portion is preferably configured to issue an identifying information take over command for causing the first-layer computer to take over the identifying information that had been assigned to the second-layer computer when the abnormal condition occurs in the second-layer computer.

That is, the buffer processing portion is configured to relay an exchange of the data between the first-layer computer and the second-layer computer based on the identifying information (for example, an IP address or a host name) assigned to each of the first-layer computer and the second-layer computer. And the substitute command output processing portion issues an identifying information take over command for causing the first-layer computer to take over the identifying information that had been assigned to the second-layer computer in which the abnormal condition occurred, before outputting the substitute command. Thus, when an abnormal condition occurs in the second-layer computer and thus the second-layer program that had been executed by the second-layer computer should be caused to be executed by the first-layer computer, the buffer processing portion will be able to relay the data, which used to be exchanged with the second-layer computer in which the abnormal condition occurred, to or from the substituting first-layer computer.

Thus, even when an abnormal condition occurs in the second-layer computer and thus the second-layer program that had been executed by the second-layer computer should be caused to be executed by the first-layer computer, neither the first-layer program nor the second-layer program has to modify the identifying information which each program manages and to which commands and reported data are to be transmitted. As a result, a facility control system can be provided in which its configuration can be simplified.

In an embodiment of the facility control system in accordance with the present invention, the facility control system preferably further comprises a monitoring computer that executes a monitoring program which collects and displays information on an operational state of the facility apparatus from the first-layer computer or the second-layer computer, wherein the substitute command output processing portion is preferably configured to issue a second substitution command for executing the monitoring program that had been executed by the monitoring computer in which an abnormal condition occurred, as a second substitute-execution-subject program, and wherein the substitute command output processing portion is preferably configured to issue the second substitution command to the first-layer computer based on selection information selected by the selection processing portion.

That is, when a monitoring computer is provided that executes a monitoring program which collects and displays information on an operational state of the facility apparatus from the first-layer computer or the second-layer computer, and when an abnormal condition occurs in the monitoring computer, the monitoring program that had been executed by the monitoring computer can be executed by the first-layer computer. Thus, it is not necessary to provide an additional computer to substitute for the monitoring computer, which can reduce the costs.

In an embodiment of the facility control system in accordance with the present invention, the facility apparatus is preferably an article transport device in a distribution facility, wherein the first-layer computer is preferably configured to manage the apparatus controller that controls the operation of the article transport device, wherein the second-layer computer is preferably configured to manage article transport information for the entire distribution facility, and wherein the task request is preferably a transport request for an article in the distribution facility.

That is, even when an abnormal condition occurs in the second-layer computer which manages the article transport information for the entire distribution facility, it is possible to have the second-layer program, that had been executed by the second-layer computer, executed by the first-layer computer which manages the apparatus controller which controls the operation of an article transport device in substitution for the second-layer computer in question. Therefore, the article transport device in the distribution facility can operate properly while reducing a lowering of the processing efficiency of the entire facility control system in the distribution facility.

Alternative Embodiments (1) In the embodiment described above, an example was described in which, when the substitute command output processing portion issues a substitute command, a stop command is also issued to the second-layer computer 20 in order to stop the second-layer program 21 that had been executed by the second-layer computer 20 in which an abnormal condition occurred. In place of this configuration, the system may be configured to check whether the second-layer program 21 has stopped and displays the result of the checking.

(2) In the embodiment described above, an example was described in which the message queue program 44 is configured to use the IP address assigned to the first-layer computers and the second-layer computer as identifying information to relay the exchange of data among these computers based on the IP address, and to issue an identifying information take over command for causing the first-layer computer 10 to take over the IP address that was assigned to the second-layer computer 20 in question when an abnormal condition occurs in the second-layer computer 20. In place of this configuration, the message queue program 44 may be configured to use host names as identifying information to relay the exchange of data among these computers based on the host names and to issue an identifying information take over command for causing the first-layer computer 10 to take over the host name that was assigned to the second-layer computer 20 in question when an abnormal condition occurs in the second-layer computer 20.

In addition, in the embodiment described above, the service switching program 43 is configured to assign, as a virtual IP address, the IP address that was assigned to the computer in which an abnormal condition occurred, to the network interface of the substitute computer after activating a substitute-execution-subject program installed in the substitution computer in accordance with the substitution command. However, in place of this configuration, the service switching program 43 may be configured to use host name as identifying information and to assign the host name that was assigned to the computer in which an abnormal condition occurred, to the substitute computer after activating a substitute-execution-subject program installed in the substitution computer.

(3) In the embodiment described above, an example was illustrated in which the substitute command output processing portion is configured to be able to output the second substitution command for causing the monitoring program 31, that had been executed by the monitoring computer 30 in which an abnormal condition occurred, to be executed as the second substitute-execution-subject program. However, the substitute command output processing portion may be configured not to cause the monitoring program 31 to be executed as a substitute-execution-subject program.

(4) In the embodiment described above, an example was illustrated in which, the first-layer programs 11 issue apparatus operating commands to the apparatus controllers C such that, when an article B arrives at the end location of a transport operation by a facility apparatus, its article ID is transmitted to the first-layer program 11 that is assigned to the apparatus controller C of the facility apparatus that takes over the transport operation of the article B, in order to operate the facility apparatuses one after another from the transport initial position to a transport target position in task command data. In place of this configuration, a configuration may be adapted in which information may be exchanged between or among the first-layer programs 11 such that an apparatus controller C reports completion of an operation by a facility apparatus to the first-layer program 11 that is assigned to the apparatus controller C, and such that this first-layer program 11 transmits a transport start request, for causing the transport of the article B to be started, to the first-layer program 11 that is assigned to the facility apparatus that should be operated next.

(5) In the embodiment described above, an example was illustrated in which, the first-layer computer 10 issues apparatus operating commands to one kind of apparatus controllers C. However, in place of this configuration, one first-layer computer 10 may be configured to issue apparatus operating commands to two or more kinds of apparatus controllers C. An example of such configuration may be one in which only one first-layer computer 10 is provided to the facility control system for controlling the operations of the facility apparatuses of the warehouse having, for example, stacker cranes 51, the storing-and-retrieving conveyers 52, and sorting carriages 50, etc., When configured in this manner, the first-layer computer 10 would transmit commands sequentially to the stacker crane controller 51C, the storing-and-retrieving conveyer controller 52C, and the sorting carriage controller 50C in accordance with a command in the received task command data.

(6) In the embodiment described above, an example was illustrated in which two computers of approximately equal power (including the same power) are used as the first-layer computers 10, and in which the selection processing portion can select one of the two first-layer computers 10 for executing the second-layer program 21, based on a manual operation. In place of this configuration, a high power computer with enough processing power to execute both the first-layer program and the second-layer program simultaneously, and a low power computer which has less processing power than the high power computer (e.g., processing power sufficient to execute only the first-layer program) may be provided. And the high power computer may be defined as the substitute candidate computer. This configuration prevents the second-layer program from being executed by a low power computer, which reduces lowering of the processing efficiency of the entire facility control system when a high power computer and a low power computer are used as the first-layer computers.

(7) In the embodiment described above, the facility control system of the present invention was described using a configuration where the control system is applied to a distribution facility 1. However, in place of this configuration, it is also possible to apply the facility control system of the present invention to, for example, a production line. That is, the facility apparatus may be various production devices in the product line. The first-layer computers 10 may be configured to manage the apparatus controllers C that control the operations of the production devices. The second-layer computer 20 may be configured to manage transport information of the entire production facility. And each task request may be a production request for an article in the production facility.

(8) In the embodiment described above, an example was illustrated in which the communication lines L are configured to be a LAN having a star topology and to perform communication using TCP/IP. However, the invention is not limited to such configuration. For example, the network topology may be a bus network topology or a ring network topology. In addition, an original protocol can also be used for the network protocol.

(9) In the embodiment described above, an example was illustrated in which the first-layer computer 10b for the cranes is caused to execute the message queue program 44. However, the invention is not limited to such configuration. For example, the message queue program 44 may be configured to be executed by other first-layer computers 10 (such as, the first-layer computer 10a for the conveyors, etc.) or the second-layer computer 20. And as such, the computer for executing the message queue program 44 may be selected as desired. In addition, in such a case, when an abnormal condition occurs in the computer that executes the message queue program 44, instead of causing a substitute computer to take over through a substitute command issued by the service switching program 43 as illustrated in the embodiment described above, various configurations may be adapted, such as causing a predetermined back-up computer to take over.

(10) In the embodiment described above, a configuration was adapted in which the second-layer computer 20 is physically disconnected from the network when an abnormal condition occurs, in light of the possibility that the second-layer program 21 that had been executed by the second-layer computer 20 in which an abnormal condition occurred did not stop running properly. However, in place of this configuration, a configuration may be adapted in which, when the service switching program 43 that functions as the substitute command output processing portion issues a substitute command, it also issues a stop command to the second-layer computer 20 in order to stop the second-layer program 21 executed by the second-layer computer 20 in which an abnormal condition occurred.

What is claimed is:

1. A facility control system comprising: a plurality of apparatus controllers, each of which controls an operation of a corresponding one of a plurality of facility apparatuses;
 a plurality of first-layer computers, each of which executes a first-layer program for issuing an apparatus operating command for a corresponding one of the plurality of facility apparatuses to a corresponding one of the plurality of apparatus controllers that each first-layer computer is assigned to and for managing an operation result of the corresponding facility apparatus transmitted from the corresponding apparatus controller, the plurality of first-layer computers including a first task computer assigned to one type of the apparatus controllers and a second task computer assigned to a different type of the apparatus controllers;
 a second-layer computer that executes a second-layer program for issuing a task command to at least one of the plurality of first-layer computers in order to cause at least one of the plurality of facility apparatuses required to process a task request to be operated in accordance with the task request which is a request for an operation that is to be accomplished by operating the at least one of the plurality of facility apparatuses, and for managing a result of a task that is related to the task request based on the operation result of the at least one of the plurality of facility apparatuses transmitted from the at least one of the plurality of first-layer computers; and wherein the plurality of facility apparatuses are a plurality of article transport devices in a distribution facility, wherein each of the plurality of first-layer computers is configured to manage the corresponding apparatus controller that controls the operation of a corresponding one of the plurality of article transport devices, wherein the second-layer computer is configured to manage article transport information for the entire distribution facility, and wherein the task request is a transport request for an article in the distribution facility;
 a service switching program comprising a selection processing portion and a substitute command output processing portion;
 wherein the selection processing portion is configured to display an information window on a display, the information window showing a list of a state of each of the plurality of first-layer computers and a state of the second-layer computer to distinguishably indicate whether each of the computers is operating normally or an abnormal condition has occurred, and
 recognizably showing which program or programs are currently executed by which computer or computers,
 wherein the selection processing portion is configured to display an indication that an abnormal condition has occurred on the information window and to accept a manual operation for selecting whether to cause one of the plurality of first layer computers to execute the second-layer program that had been executed by the second-layer computer, when an abnormal condition is detected in the second-layer computer;
 wherein the substitute command output processing portion issues a substitute command for executing, as a substitute-execution-subject program, the second-layer program that had been executed by the second-layer computer in which the abnormal condition occurred;
 wherein two or more of the plurality of the first-layer computers including the first task computer and the second task computer are defined as substitution candidate computers that can execute the second-layer program, and wherein the selection processing portion is configured to be able to select one of the substitution candidate computers for executing the substitute-execution-subject program, based on the manual operation,
 wherein the substitute command output processing portion is configured to output the substitute command in accordance with a selection information selected by the selection processing portion, and
 wherein the selected one of the substitution candidate computers is configured to execute the substitute-execution-subject program based on the substitute command that the substitute command output processing portion outputs, and
 wherein the substitute-execution-subject program is executed by a selected one of the substitution candidate computers when the substitute command is issued with the selection information indicating the selection by the manual operation to cause the selected one of the substitution candidate computers to execute the second-layer program that had been executed by the second-layer computer, when an abnormal condition is detected in the second-layer computer.

2. The facility control system as defined in claim 1, wherein the selection processing portion is configured to display a selection window on the display, the selection window accepting the manual operation for selecting whether to cause one of the plurality of first-layer computers to execute the second-layer program,
wherein the selection window accepts the manual operation for selecting one of the substitution candidate computers for executing the substitute-execution-subject program, and
wherein the selection window is displayed when the information window accepts a specific manual operation.

3. The facility control system as defined in claim 1, wherein a high power computer with enough processing power to execute both the first-layer program and the second-layer program simultaneously and a low power computer which has less processing power than the high power computer are used as the plurality of first-layer computers, wherein the high power computer is defined as one of the substitute candidate computers.

4. The facility control system as defined in claim 1, further comprising a message queue program comprising a buffer processing portion that relays data for the task command and data for the operation result communicated between the plurality of first-layer computers and the second-layer computer,
wherein the buffer processing portion is configured to relay an exchange of the data between the plurality of first-layer computers and the second-layer computer based on identifying information with the identifying information assigned to each of the plurality of first-layer computers and the second-layer computer, and
wherein the substitute command output processing portion is configured to issue an identifying information take over command for causing the selected one of the substitution candidate computers to take over the identifying information that had been assigned to the second-layer computer when the abnormal condition occurs in the second-layer computer.

5. The facility control system as defined in claim 1, further comprising:
a monitoring computer that executes a monitoring program which collects and displays information on an operational state of each of the facility apparatuses from the plurality of first-layer computers or the second-layer computer,
wherein the substitute command output processing portion is configured to issue a second substitution command for executing the monitoring program that had been executed by the monitoring computer in which an abnormal condition occurred, as a second substitute-execution-subject program, and
wherein the substitute command output processing portion is configured to issue the second substitution command to one of the plurality of first-layer computers based on selection information selected by the selection processing portion.

6. The facility control system as defined in claim 1, wherein the facility apparatus controlled by the apparatus controller that the first task computer is assigned to acts as a first article transfer device for transferring an article in a distribution facility, and
wherein the facility apparatus controlled by the apparatus controller that the second task computer is assigned to acts as a second article transfer device for transferring an article in the distribution facility, which is different from the first article transfer device in article transfer form.

7. The facility control system as defined in claim 6, wherein the first article transfer device is a stacker crane, and the second article transfer device is a conveyor.

8. In a facility control method using a facility control system having:
a plurality of apparatus controllers, each of which controls an operation of a corresponding one of a plurality of facility apparatuses;
a plurality of first-layer computers, each of which executes a first-layer program for issuing an apparatus operating command for a corresponding one of the plurality of facility apparatuses to a corresponding one of the plurality of apparatus controllers that each first-layer computer is assigned to and for managing an operation result of the corresponding facility apparatus transmitted from the corresponding apparatus controller, the plurality of first-layer computers including a first task computer assigned to one type of the apparatus controllers and a second task computer assigned to a different type of the apparatus controllers; and
a second-layer computer that executes a second-layer program for issuing a task command to at least one of the plurality of first-layer computers in order to cause at least one of the plurality of facility apparatuses required to process a task request to be operated in accordance with the task request which is a request for an operation that is to be accomplished by operating the at least one of the plurality of facility apparatuses, and for managing a result of a task that is related to the task request based on the operation result of the at least one of the plurality of facility apparatuses transmitted from the at least one of the plurality of first-layer computers;
wherein the plurality of facility apparatuses are a plurality of article transport devices in a distribution facility, wherein each of the plurality of first-layer computers is configured to manage the corresponding apparatus controller that controls the operation of a corresponding one of the plurality of article transport devices, wherein the second-layer computer is configured to manage article transport information for the entire distribution facility, and wherein the task request is a transport request for an article in the distribution facility;
the facility control method comprising the following steps that are performed by the facility control system;
(a) selecting, based on a manual operation, whether to cause one of the plurality of first-layer computers to execute the second-layer program that had been executed by the second-layer computer, when an abnormal condition occurs in the second-layer computer; and
(b) issuing a substitute command for executing, as a substitute-execution-subject program, the second-layer program that had been executed by the second-layer computer in which the abnormal condition occurred;
wherein two or more of the plurality of first-layer computers including the first task computer and the second task computer are defined as substitution candidate computers that can execute the second-layer program,
wherein in step (a), one of the substitution candidate computers for executing the substitute-execution-subject program is selected based on the manual operation,
wherein in step (b), a substitute command for causing the selected one of the substitution candidate computers to execute the substitute-execution-subject program is issued in accordance with selection information selected in step (a) and wherein the substitute-execution-subject program is executed by the selected one of the substitution candidate computer when the substitute command is issued, wherein, in step (a), when the abnormal condition is detected in the second-layer computer, a selection processing portion of a service switching program displays an indication that an abnormal condition has occurred on an information window on a display and is ready to accept the manual operation, and wherein the information window is configured to show a list of a state of each of the plurality of first-layer computers and a state of the second-layer computer to distinguishably indicate whether each of the computers is operating normally or an abnormal condition has occurred, and recognizably show which program or programs are currently executed by which computer or computers.

9. The facility controlling method as defined in claim 8, wherein in step (a), a selection window is displayed on the display, the selection window accepting the manual operation for selecting whether to cause one of the plurality of first-layer computers to execute the second-layer program, wherein the selection window accepts the manual operation for selecting one of the substitution candidate computers for executing the substitute-execution-subject program, and wherein in step (a), the selection window is displayed on the display when the information window accepts a specific manual operation with the indication being displayed on the information window.

10. The facility controlling method as defined in claim 8, wherein a high power computer with enough processing power to execute both the first-layer program and the second-layer program simultaneously and a low power computer which has less processing power than the high power computer are used as the first-layer computers in the facility control system, wherein the high power computer is defined as one of the substitute candidate computers.

11. The facility controlling method as defined in claim 8, further comprising, as a step performed by the facility control system:

(c) relaying data for the task command and data for the operation result communicated between the plurality of first-layer computers and the second-layer computer, wherein, in step (c), an exchange of the data between the first-layer computers and the second-layer computer is relayed based on identifying information with the identifying information assigned to each of the plurality of first-layer computers and the second-layer computer, and wherein, in step (b), an identifying information take over command is issued for causing the selected one of the substitution candidate computers to take over the identifying information that had been assigned to the second-layer computer when the abnormal condition occurs in the second-layer computer.

12. The facility controlling method as defined in claim 8, wherein the facility control system further includes a monitoring computer that executes a monitoring program which collects and displays information on an operational state of each of the facility apparatuses from the plurality of first-layer computers or the second-layer computer, wherein, in step (b), a second substitution command is issued for executing the monitoring program that had been executed by the monitoring computer in which an abnormal condition occurred, as a second substitute-execution-subject program, and wherein, in step (b), the second substitution command is issued to one of the plurality of first-layer computers based on a selection information selected in step (a).

13. The facility control method as defined in claim 8, wherein the facility apparatus controlled by the apparatus controller that the first task computer is assigned to acts as a first article transfer device for transferring an article in a distribution facility, and wherein the facility apparatus controlled by the apparatus controller that the second task computer is assigned to acts as a second article transfer device for transferring an article in the distribution facility, which is different from the first article transfer device in article transfer form.

14. The facility control method as defined in claim 13, wherein the first article transfer device is a stacker crane, and the second article transfer device is a conveyor.

* * * * *

UNITED STATES PATENT AND TRADEMARK OFFICE
CERTIFICATE OF CORRECTION

PATENT NO. : 9,778,625 B2
APPLICATION NO. : 13/622682
DATED : October 3, 2017
INVENTOR(S) : Kouichi Ikawa et al.

It is certified that error appears in the above-identified patent and that said Letters Patent is hereby corrected as shown below:

In the Claims

Column 24, Line 46, Claim 8, delete "system;" and insert -- system: --

Signed and Sealed this
Twenty-sixth Day of December, 2017

Joseph Matal
*Performing the Functions and Duties of the
Under Secretary of Commerce for Intellectual Property and
Director of the United States Patent and Trademark Office*